Dec. 9, 1941.   L. N. MESTRE   2,265,182
APPARATUS FOR DIASCOPIC PROJECTION
Filed April 27, 1939   2 Sheets-Sheet 2

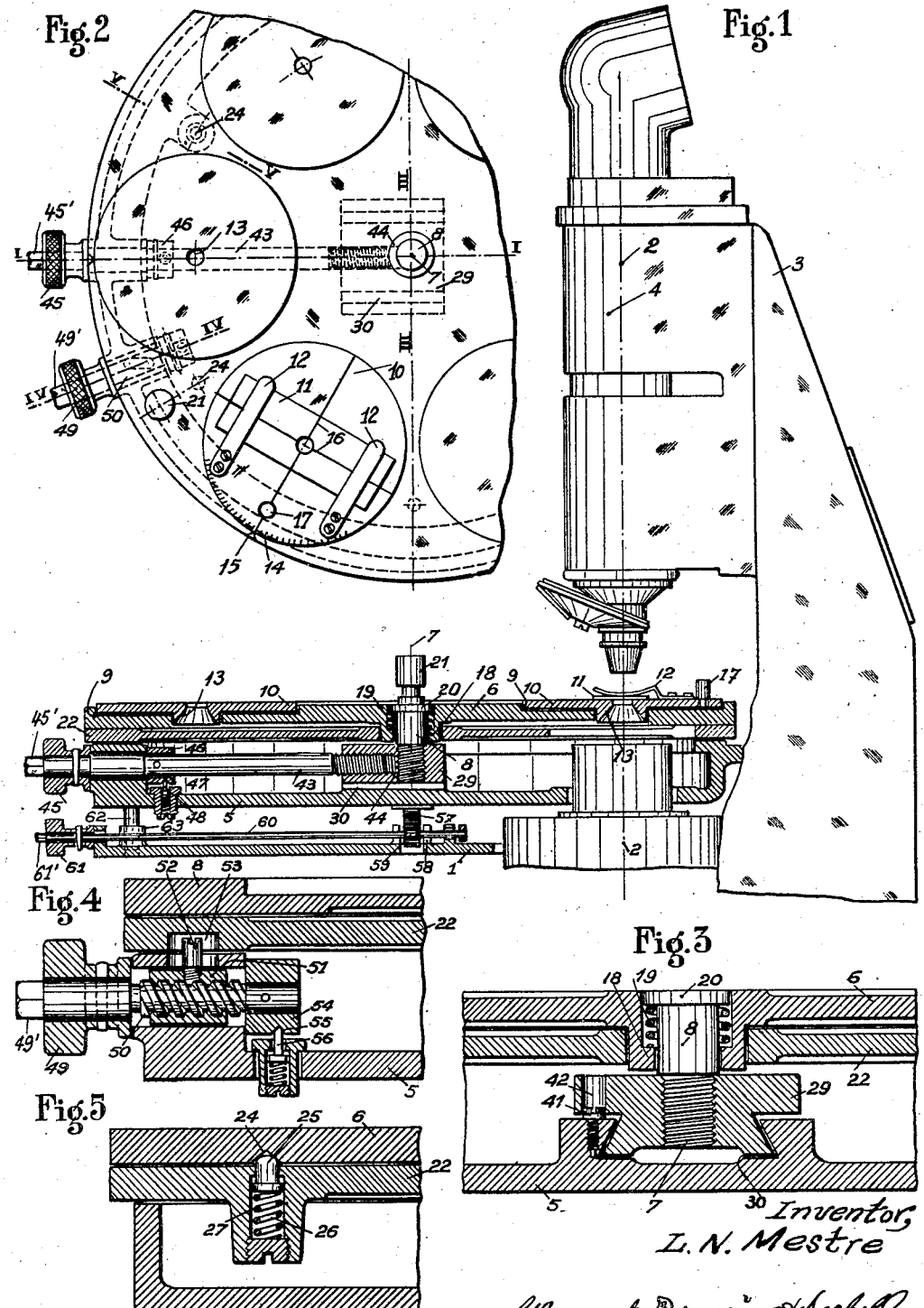

Inventor
L. N. Mestre
By Glascock Downing & Seebold
Attys.

Patented Dec. 9, 1941

2,265,182

UNITED STATES PATENT OFFICE 2,265,182

APPARATUS FOR DIASCOPIC PROJECTION

Louis Nicolas Mestre, Paris, France, assignor to Anciens Etablissements Barbier, Benard & Turenne, Paris, France, a company of France Application April 27, 1939, Serial No. 270,471
In France November 30, 1936

5 Claims. (Cl. 88—40)

My invention relates to apparatus for the telescopic projection, i. e. adapted to the projection of transparent elements such as for instance microscopic preparations, positive and negatives, or the like.

One of the objects of my invention is a supporting plate adapted to carry a number of transparent elements, disposed to be successively brought into a position centered on the optical axis of the apparatus to be optically projected by transparency and arranged to allow the orientation of said elements to be readily effected.

A further object of my invention is to provide in cooperation with a such supporting plate a system of markings designed to allow the easy putting in place of the transparent elements without proceeding by trials and errors.

The supporting plate according to the invention is provided with a number of preferably removable preparation carriers, each separately supported by said plate to be rotatable upon itself and provided with a central light passage and with means for removably holding a transparent element above said passage, said supporting plate being movable to allow the light passages of the said carriers to be successively brought into a position centered upon the optical axis of the optical projection apparatus.

In a preferred embodiment, said supporting plate is movable about a preferably vertical axis, said preparation carriers being distributed about said axis to form a circular row.

Said supporting plate is advantageously movable parallel with the optical axis of the apparatus responsive to an appropriate control enabling focussing to be effected readily.

A further object of my invention is to enable transparent elements of large area to be projected in continuous parts and, for this purpose, at least one of said preparation carriers is provided with a sliding carriage arranged to carry said transparent element any part of which is thus adapted to be brought above the light passage provided in the preparation carrier.

The supporting plate is preferably combined with micrometer control means adapted to selectively displace it in two directions, so as to finely adjust the centering of the transparent elements, said arrangement being particularly convenient for the projection of microscopic preparations or the like.

With these and other objects in view, the invention consists in the construction, combination and arrangement of parts as will be hereinafter fully described with reference to accompanying drawings, given solely by way of example and in which:

Fig. 1 is an elevation of an apparatus for optical projection according to an embodiment, the supporting plate being cut along line I—I of Fig. 2;

Fig. 2 is a partial corresponding plane view of the supporting plate;

Figs. 3, 4 and 5 are partial enlarged sections along lines III—III, IV—IV and V—V of Fig. 2;

Figure 6:
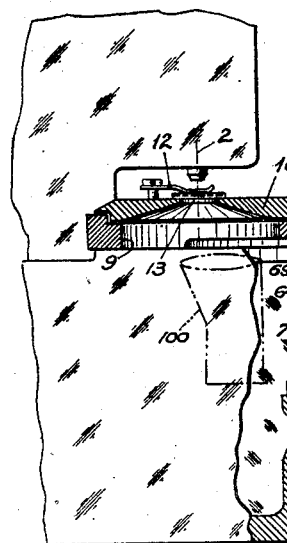
Fig. 6 is a partial sectional elevation of a modification of the embodiment shown on Fig. 1.

According to the embodiment shown on Figs. 1 to 5, the apparatus comprises a frame 1 carrying at its lower part an illuminating system conjugated with an optical system of vertical optical axis 2 and provided with a bracket 3 supporting an optical amplifier system 4 centered on the axis 2 and adapted to project onto a screen the image of a transparent element such as a preparation thus illuminated.

A circular horizontal supporting plate 6 is carried by the frame 1 by means of a support 5 between said two optical systems. The plate 6 is mounted for rotation about the axis 7 of a vertical pivot 8 and is adapted to carry a number of transparent elements such as preparations, distributed about the axis 7 adapted to be successively brought to a centered position on the axis 2 by rotating the plate 6 on itself, in order to be optically projected by transparency.

The said transparent elements are carried by the supporting plate 6 by means of removable preparation carrier discs 10 arranged in recesses 9 provided in the upper surface of the plate 6. Each of said preparation carrier discs 10, on which a transparent element 11 is shown fixed through the instrumentality of springs 12, has a central opening 13 adapted to be centered on the optical axis 2 and can rotate on itself in the plate 6, such rotation being controlled by a knurled knob 17 or by knurled portions provided in the upper surface of the carrier disc. The position of each preparation carrier 10 relatively to the plate 6 is marked by graduations 14 or marks on its periphery co-operating with a mark 15 made on the upper surface of the plate 6 or by any other system of marking.

On the other hand the position of each transparent element 11 on its carrier disc 10 is marked by means of two perpendicular radial lines 16 corresponding to similar polar radii marked on the element 11. The same element 11 or preparation can have a plurality of polar radii of different colours for example and relating to a plurality of parts to be projected. No hesitation can thus occur.

The plate 6 is mounted on the pivot 8 through the intermediary of its cup-shaped central part 18 at the bottom of which bears a spring 19 which bears on the other hand against a collar 20 of the pivot 8. The plate 6 carries on its periphery one or a number of knurled knobs 21 enabling its rotation to be controlled. The plate 6 rests on a support plate 22 arranged below it and relatively to which it can rotate. The relative positions of the two plates 6 and 22 corresponding to the centering on the axis 2 of the successive carriers 10 are marked by means of equidistant conical recesses 24 provided in the lower surface of the plate 6 and co-operating with a projection 25 (Fig. 5) arranged in a housing 27 provided in the support plate 22 and urged by a spring 26 in the direction of the lower surface of the plate 6.

The lower end of the pivot 8 is carried by a slide 29 mounted in a dove-tailed housing 30 (Fig. 3) provided in the frame 1 in a radial direction relatively to the plates 6 and 22.

The length of the displacement of the slide 29 along its housing 30 is limited by a screw 41 of which the head is in a groove 42 provided in said slide. Said displacement is effected responsive to the rotation of a screwed rod 43 (Figs. 1 and 2), screwed into a hole 44 provided in said slide 29, the rotation of said rod 43 being controlled by a knurled knob 45 arranged on the outside within reach of the operator's hand. A ring 46 is pinned onto the rod 43 and has a conical recess 47 co-operating with a projection 48 carried by the frame 1 and resiliently pressed against the ring 46, the recess 47 being arranged in such a manner that the projection 48 penetrates therein at the mean position of the carriage 29 and thus serves as a zero mark.

A second screwed rod 50 (Figs. 2 and 4) terminated by a knurled knob 49 is carried by the frame 1 and co-operates with a nut 51 carrying a projection 52 sliding in a nonradial housing 53 provided in the plate 22 so as to cause said plate to rotate slightly by displacement of the said nut 51 along the rod 50. This latter rod carries in a similar manner to the rod 43 a ring 54 or the like having a conical recess 55 co-operating with a spring pressed projection 56 carried by the frame 1 and forming a zero mark.

It will be understood that the rotation of the plate 6 relatively to the support plate 22 by means of the knurled knobs 21 between two stoppages caused by the projection 25 penetrating into two successive notches 24, substitutes one preparation or the like for another on the optical axis 2, the adjustment of its exact position longitudinally and angularly being effected by the knobs 45 and 49 moving the two plates 22 and 6 in unison.

The adjustment of position of the transparent elements is thus accurately effected.

The support 5 is so carried by the frame 1 that it is adapted to be displaced together with the plate 6 in a direction parallel with the vertical optical axis 2. For that purpose, the lower part of the support 5 carries a rack 57 slidably mounted in a vertical guide 58 provided in the frame 1. The rack 57 cooperates with a toothed wheel 59 fixed on a rotary horizontal rod 60 carried by the frame 1 and terminating in an operating knob 61. The support 5 is further peripherally provided with projections 62 adapted to slide in vertical guides 63 fixed to the frame 1 and acting to maintain the support 5 parallel with itself.

It is understood that the rotation of the rod 60 in one direction or the other acts to displace the plate 6 with reference to the optical system, in a direction parallel with the axis 2 of said system, and enables the focusing of each transparent element to be readily effected or perfected.

Furthermore the various actuating rods 43, 50 and 60 have been shown terminating in square portions 43', 49', 61', that are intended to be coupled to remote controls by means of servo-motors which may be hydraulic, pneumatic or electric and which enable all the operations to be controlled at distance. In the case of the use of such a remote control, the knurled knobs 45, 49, 61 may of course be eliminated.

Figure 8:
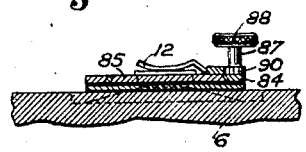
Fig. 8 is an enlarged partial section along the line VIII—VIII of Fig. 7.
Figure 7:
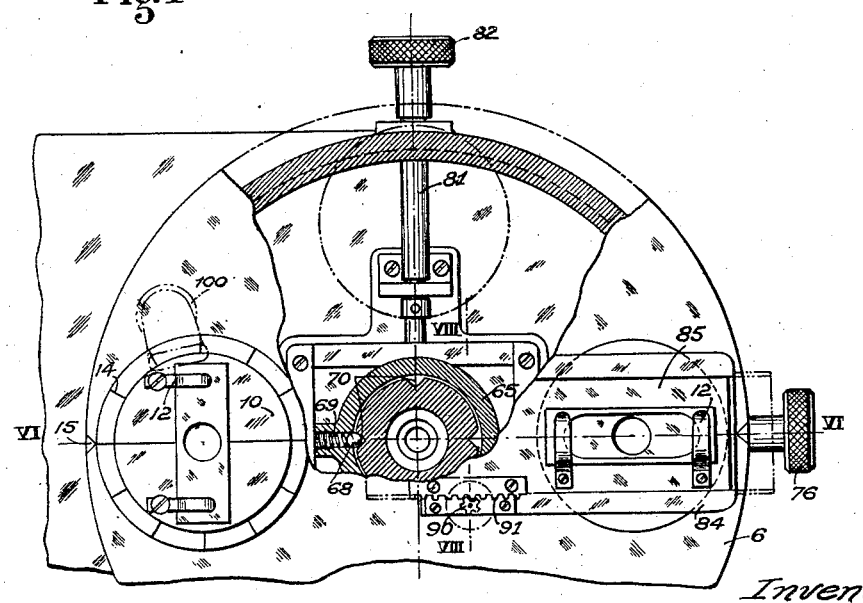
Fig. 7 is a corresponding plane view with parts cut away.

Figs. 6 to 8 relate to a modification of the preparation-carrier plate 6 which is shown resting on a ring-shaped faced horizontal surface 63 formed on the frame 1. The plate 6 is mounted, as in the previous example, on a pivot 8 of which 7 is the axis, by means of its cup-shaped central portion on the bottom of which bears a spring 19 which surrounds the pivot 8 and the other end of which is in contact with a collar 20 terminating said pivot. The pivot 8 is carried by a carriage 64 at the top of which is mounted an expansion 65 embracing an annulus 66 of which the axis is 7 and which is located at the lower part of the plate 6. A ball 68 is pressed by a spring 69 against said annulus 66 which is provided with a number of notches 70 which correspond to the various operative positions of the plate 6 (four in the example shown) and which are thus located. The carriage 64 is slidably mounted in a horizontal groove 72 of dove-tail shape and is provided with a tapped hole 73 parallel with the groove 72 and in which is engaged a thread provided on a rotary rod 75 which is carried by the frame 1 and terminates in an operating knob 76.

The horizontal groove 72 is itself provided in a carriage 78, the lower part of which is slidably mounted in a horizontal groove 79 of dove-tail shape perpendicular to the groove 72. The carriage 78 is likewise provided with a tapped hole 80 parallel with the groove 72 co-operating with a threaded portion of a rod 81 which is carried by the frame 1 and terminates in a knurled operating knob 82.

It will be understood that, under these conditions, the micrometric control means actuated by the knobs 76 and 82 enable the plate 6 to be moved on the faced surface 63 and, consequently, its position to be accurately adjusted.

As in the previous example, the plate 6 is provided with a number of circular openings 9, shown as being four in number, which form guide surfaces carrying preparation carriers 10 which are each provided with a central opening 13 and carry a retaining spring 12 for a slide or the like.

As shown in Fig. 6, said preparation carriers 10 project from the upper surface of the plate 6 and their bevelled periphery is provided with graduations 14 opposite a mark 15 provided on the surface of the plate 6.

In order to enable transparent objects of large area to be projected, one of the preparation carrier discs 10, shown in section in Fig. 8, carries a support 84 for a carriage 85. Said carriage 85 is adapted to slide radially, this sliding being controlled by a rod 87 terminating in a knob 88 and carrying a gear 90 which meshes with a rack 91 provided in the carriage 85. The carriage 85 carries the retaining system 12 for the transparent element to be projected.

It is thus possible, with a very slight projection above the surface of the plate, which enables the objectives to be kept near said surface, to explore longitudinally a slide or the like of great length.

Finally, in order to prevent an abnormal heating of the preparations during projection, the frame 1 carries under the plate 6 and adjacent the axis 2 of the luminous beam, a nozzle 100 which is connected to a source of compressed air and is directed in the direction of the transparent element that is centered on said axis and thus in the projection position.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. An optical apparatus supporting stage for a plurality of transparent objects such as microscopic specimens, which comprises a plate, a plurality of discs rotatably mounted in spaced relation on one face of said plate, each of said discs having a central light passage therein, means for holding a transparent element above said passage, said plate also having a light passage extending therethrough and coaxial with each of said central light passages of said discs respectively and means for mounting said plate for movement to enable said light passages to be brought successively substantially into register with the optical axis of said optical apparatus.

2. An optical apparatus supporting stage for a plurality of transparent objects such as microscopic specimens which comprises a plate, means mounting said plate for rotation about an axis perpendicular to its surface, a plurality of discs rotatably mounted in spaced relation on one face of said plate, said discs being distributed about said axis to form a circular row, each of said discs having a central light passage therein, means for holding a transparent element above said passage, said plate also having a light passage extending therethrough and coaxial with each of said central light passages of said discs respectively.

3. An optical projection apparatus supporting stage for a plurality of transparent objects such as microscopic specimens which comprises a plate, a plurality of discs rotatably mounted in spaced relation on one face of said plate, each of said discs having a central light passage, a carriage mounted to slide radially with reference to at least one of said discs, supporting means for said carriage rigid with said last named disc, said carriage being provided with a light opening and being arranged to carry a transparent object, said plate also having a light passage extending therethrough and coaxial with each of said central light passages of said discs respectively and means for mounting said plate for movement to enable said light passages to be brought successively substantially into register with the optical axis of said optical apparatus.

4. An optical apparatus supporting stage as claimed in claim 3 including adjusting means carried by said support and mounted to control the radial sliding motion of the said carriage.

5. An optical apparatus supporting stage as claimed in claim 1 including further a fine adjusting mechanism for adjusting the position of said plate and coupling means adapted to couple said mechanism to a remote control.

LOUIS NICOLAS MESTRE.